United States Patent
Bolleman et al.

(10) Patent No.: US 6,286,063 B1
(45) Date of Patent: Sep. 4, 2001

(54) MICROPROCESSOR-CONTROLLED BROADCAST RECEIVER EMBEDDED IN AN EXTERNAL PERIPHERAL WITH DIGITAL COMMUNICATIONS INTERFACE FOR BI-DIRECTIONAL COMMUNICATION WITH A COMPUTER REMOTELY LOCATED

(75) Inventors: Brent Bolleman, Vancouver (CA); John Cotner, Ypsilanti, MI (US); David Todd, Vancouver (CA)

(73) Assignee: Sonigistix Corporation, Richmond (CA)

( * ) Notice: Subject to any disclaimer, the term of this patent is extended or adjusted under 35 U.S.C. 154(b) by 0 days.

(21) Appl. No.: 09/093,825

(22) Filed: Jun. 8, 1998

(51) Int. Cl.$^7$ .................................................. G06F 13/10
(52) U.S. Cl. .............................. 710/62; 710/69; 710/106; 709/217
(58) Field of Search .................................. 710/67, 69, 73, 710/106, 218, 219, 62, 64, 102; 709/218, 219, 217; 348/552, 553

(56) References Cited

U.S. PATENT DOCUMENTS

| | | | |
|---|---|---|---|
| 4,525,865 | 7/1985 | Mears | 455/186 |
| 4,777,657 | * 10/1988 | Gillaspie | 455/186 |
| 4,787,063 | 11/1988 | Muguet | 364/900 |
| 4,792,986 | 12/1988 | Garner et al. | 455/89 |
| 4,843,588 | 6/1989 | Flynn | 364/900 |
| 4,873,584 | 10/1989 | Hashimoto | 358/335 |
| 4,881,273 | 11/1989 | Koyama et al. | 455/161 |
| 4,907,079 | 3/1990 | Turner et al. | 455/2 |
| 5,054,022 | 10/1991 | van Steenbrugge | 370/85.6 |
| 5,086,513 | 2/1992 | Lawrence et al. | 455/186 |
| 5,220,682 | 6/1993 | Tomohiro | 455/161.2 |

(List continued on next page.)

FOREIGN PATENT DOCUMENTS

05292417 A * 11/1993 (JP).

OTHER PUBLICATIONS

"Add TV and FM Radio to Your PC," Channel Surfer—ADS Technologies, Multi–media, Audio, Video, (First seen by applicants on May 6, 1998).

Clegg, "The Radio Broadcast Data System," Digital Consumer Electronics Handbook, Chapter 15, Section 1, pp. 15.1–15.9 (1997).

GEMTEK, Radioman Windows, 2 pages (First seen by applicants on May 6, 1998).

(List continued on next page.)

Primary Examiner—Thomas Lee
Assistant Examiner—Thuan Du
(74) Attorney, Agent, or Firm—McAndrews, Held & Malloy

(57) ABSTRACT

A microcontroller or microprocessor-controlled broadcast receiver embedded in an external peripheral with a digital communications interface. In one embodiment, a microprocessor-controlled broadcast receiver is embedded in the housing of an external computer peripheral. The external computer peripheral is connected to a personal computer (PC) via a digital communications link such as USB (universal serial bus). Control data is relayed from the personal computer to the broadcast receiver in the external computer peripheral via the digital communications link. Audio signals received by the broadcast receiver in the external computer peripheral may also be relayed to the personal computer via the digital communications link or via an analog interface for recording storage, or manipulation by the personal computer. The broadcast receiver may also receive data signals in addition to audio signals (datacasting). The data or audio signals or both may be encrypted.

55 Claims, 7 Drawing Sheets

U.S. PATENT DOCUMENTS

| | | | |
|---|---|---|---|
| 5,313,524 | | 5/1994 | Van Hulle et al. ............... 381/105 |
| 5,321,514 | * | 6/1994 | Martinez ............... 348/723 |
| 5,355,526 | | 10/1994 | Berninger ............... 455/161.2 |
| 5,359,367 | | 10/1994 | Stockill ............... 348/552 |
| 5,444,869 | | 8/1995 | Stricklin et al. ............... 455/89 |
| 5,448,765 | | 9/1995 | Kovanen et al. ............... 455/90 |
| 5,457,815 | | 10/1995 | Morewitz, II ............... 455/161.1 |
| 5,483,689 | | 1/1996 | O'Donnell, Jr. et al. ............... 455/200.1 |
| 5,537,104 | | 7/1996 | Van Dort et al. ............... 340/825.52 |
| 5,544,315 | | 8/1996 | Lehfeldt et al. ............... 395/200.2 |
| 5,557,541 | | 9/1996 | Schulhof et al. ............... 364/514 R |
| 5,572,194 | | 11/1996 | Shiota ............... 340/825.25 |
| 5,572,442 | | 11/1996 | Schulhof et al. ............... 364/514 C |
| 5,581,576 | | 12/1996 | Lanzetta et al. ............... 375/216 |
| 5,606,732 | | 2/1997 | Vignone, Sr. ............... 455/269 |
| 5,664,228 | | 9/1997 | Mital ............... 395/882 |
| 5,689,822 | * | 11/1997 | Zucker ............... 455/89 |
| 5,692,214 | | 11/1997 | Levine ............... 395/833 |
| 5,739,791 | | 4/1998 | Barefield et al. ............... 343/702 |
| 5,790,958 | | 8/1998 | McCoy et al. ............... 455/557 |
| 5,798,762 | * | 8/1998 | Sfarti et al. ............... 345/420 |
| 5,802,281 | * | 9/1998 | Clapp et al. ............... 395/200.04 |
| 5,802,459 | * | 9/1998 | Burke et al. ............... 455/90 |
| 5,802,460 | * | 9/1998 | Parvulescu et al. ............... 455/92 |
| 5,896,183 | * | 4/1999 | Terk et al. ............... 348/706 |
| 5,946,343 | * | 8/1999 | Schotz et al. ............... 375/200 |
| 5,999,294 | * | 12/1999 | Petsko ............... 359/145 |
| 6,072,541 | * | 6/2000 | Song ............... 348/706 |

OTHER PUBLICATIONS

Pargh, "At last, FM radio for your PC," The Gadget Guru Online, The Nation's Number One New Products Reporting Organization (First seen by applicants on May 6, 1998).

Pizzi, "U.S. Digital Audio Broadcasting Systems," Digital Consumer Electronics Handbook, Chapter 14, Section 2, p. 14.25–14.39 (1997).

Pohlmann, "Digital Audio Broadcasting," Principles of Digital Audio, Chapter 13, pp. 439–460 (1995).

* cited by examiner

MICROPROCESSOR-CONTROLLED BROADCAST RECEIVER EMBEDDED IN AN EXTERNAL PERIPHERAL WITH DIGITAL COMMUNICATIONS INTERFACE FOR BI-DIRECTIONAL COMMUNICATION WITH A COMPUTER REMOTELY LOCATED

TECHNICAL FIELD

The present invention is directed to a microcontroller or microprocessor-controlled broadcast receiver embedded in a computer peripheral with a digital communications interface for bi-directional communications with a personal computer.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to a microcontroller or microprocessor-controlled broadcast receiver embedded in an external personal computer peripheral and, more particularly, to a microcontroller-controlled broadcast receiver embedded in an external personal computer peripheral with a digital communications interface to transfer data between a personal computer and the microcontroller or microprocessor-controlled broadcast receiver.

A variety of broadcast receivers are currently available for use with a personal computer. For instance, there are a number of cards which may be plugged directly into the bus of a personal computer (PC) that feature AM and/or FM radio band receiver chips or circuits. There are also a number of cards which may be plugged directly into the bus of a personal computer that feature TV receivers. These cards, however, are not integrated into external computer peripherals, such as a multimedia speaker or computer keyboard, but are instead for use within the housing of a personal computer. Because of the close proximity of these cards to the components inside the personal computer, these cards suffer from RF interference problems, creating reception problems. As bus speeds for personal computer motherboards continue to increase, the RF interference problems faced by these internal cards will also increase. Furthermore, because these internal cards require PC operating system support, playback of the received broadcast signals (such as FM radio signals) may be interrupted if the operating system is occupied with other processing tasks.

Another solution involves the use of external broadcast receivers. Commercially available examples include external radio receivers such as the Minolta PCFM and the Gemtek Radioman. These external radio receivers are for use with a personal computer, but these external radio receivers are not integrated with another computer peripheral, such as a multimedia speaker or keyboard. The external radio receivers require the use of a separate sound card within the personal computer, as well as a separate computer speaker, to playback the received radio signal. Furthermore, existing external radio receivers also require relatively expensive serial port connections and cables to connect the receiver to a personal computer. It would therefore be an advance in the art to integrate a microcontroller or microprocessor-controlled broadcast receiver that is responsive to control signals received from a personal computer over a digital communications link, such as a universal serial bus (USB) link, with an external computer peripheral.

One objective of the present invention is to provide a cost effective microcontroller or microprocessor-controlled broadcast receiver external to the personal computer. One way the preferred embodiment of the invention provides a cost effective microprocessor-controlled broadcast receiver external to the personal computer is by embedding the broadcast receiver (preferably an FM band receiver) in a computer peripheral, thereby eliminating the need for a separate housing or case for the broadcast receiver. Furthermore, the circuitry for the microprocessor-controlled broadcast receiver can be embedded in the circuit board of the computer peripheral, eliminating the cost of a separate circuit board. By using a digital communications link, such as USB, to communicate data between the personal computer and the broadcast receiver, the need for relatively expensive serial port connections and cables is also eliminated.

Another objective of the present invention is to provide a convenient way to remotely control and program the microprocessor-controlled broadcast receiver from a personal computer. By providing a user interface on the personal computer, the user can conveniently and easily visualize, select, and change the broadcast receiver controls (such as the selected tuning frequency, output volume, etc.). By connecting the personal computer to remote programming information, such as programming information available on the internet or world-wide web, the user interface can present the user with programming information received from the internet and translate the user's selections of programming content into control signals to control the broadcast receiver. The user interface can also reside on an internet web site, allowing the user to make programming selections via a web page. The user's selections are utilized by the personal computer to directly control the broadcast receiver without further user intervention.

Another objective of the present invention is to provide broadcast signals reception and playback without a separate sound card in the controlling computer or personal computer. By integrating the broadcast receiver and an amplifier circuit into a speaker or subwoofer, the invention can playback received broadcast radio or audio signals without sending those signals back to the personal computer or sound card. When broadcast radio or audio signals require computer or sound card processing, the computer's operating system may interrupt the processing when the computer is busy with other processing tasks. Because the invention plays back received radio or audio signals without first processing them by the personal computer or sound card, the user is provided with reliable and continuous radio operation.

Another objective of the present invention is to provide improved broadcast reception and a reduction in the signal to noise ratio (SNR) by integrating the broadcast receiver in an external multimedia speaker. The RF environment inside a computer interferes with broadcast reception. As a result, the reception of internal radio cards suffers. By locating the broadcast receiver and the antennae outside of the personal computer housing, superior broadcast reception is provided.

Another objective of the present invention is to provide a less complicated computer-controlled broadcast receiver. By incorporating the broadcast receiver in an external personal computer peripheral, the number of control and power wires is minimized. Further, the user only needs to setup a single computer peripheral, as opposed to the current solutions which require the user to setup both the external computer peripheral and a separate computer-controlled broadcast receiver (whether that broadcast receiver is an external radio, an internal radio card or an internal TV tuner card).

Another objective of the present invention is to provide a receiver that can receive broadcast data signals (a datacast receiver) as well as audio signals.

Another objective of the present invention is to provide a receiver with decoding functionality. By using a "key," a broadcaster can require the user to pay to be able to receive and decode broadcast signals. This "key" can be a one-time purchase, or can have a limited duration, requiring the user to renew a subscription periodically. Data and/or audio broadcasts can be encrypted and require a key to decode.

These and other objects of the invention are discussed in or will be apparent to those skilled in the art from the following detailed description of a preferred embodiment of the invention.

SUMMARY OF THE INVENTION

The present invention relates to a microprocessor-controlled broadcast receiver embedded in an external peripheral with a digital communications interface. In one embodiment, a microprocessor-controlled broadcast receiver is embedded in the circuit board of an external multimedia computer speaker. The external multimedia computer speaker, containing the broadcast receiver, is connected to a controlling computer, such as a personal computer (PC), via a digital communications link such as USB (Universal Serial Bus). Control data, such as the user-selected RF tuning frequency, are relayed from the controlling personal computer to the external multimedia computer speaker via the digital communications link. The microcontroller or microprocessor located within the multimedia computer speaker processes the control data and directs the broadcast receiver to respond accordingly. The microcontroller located within the external multimedia computer speaker may also relay analog or digital audio signals, digital data signals, as well as status or acknowledgment information, received by the broadcast receiver to the controlling computer via the digital communications link for recording or manipulation by the controlling computer.

These and other features of the present invention are discussed or apparent in the following detailed description of the preferred embodiment of the invention.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
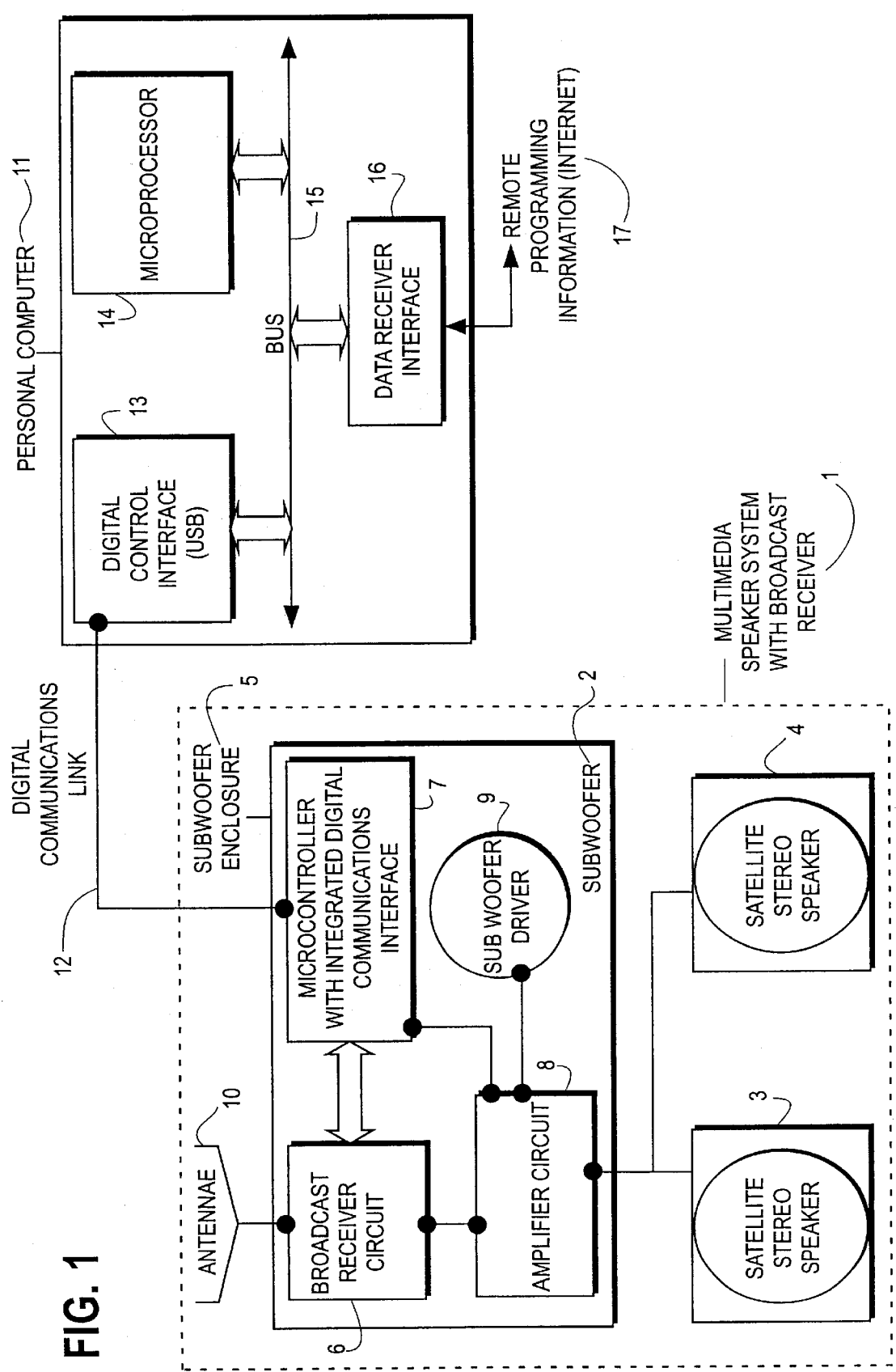
FIG. 1 is a broadcast receiver in a multimedia speaker system with remote digital control.

Referring to FIG. 1, a preferred embodiment is a multimedia speaker system with broadcast receiver 1 that includes a subwoofer 2 and satellite stereo speakers 3 and 4. The subwoofer 2 includes a subwoofer enclosure 5 that encloses a broadcast receiver circuit 6, microcontroller with integrated digital communication interface 7, amplifier circuit 8, and subwoofer driver 9. Antennae 10 may be contained within the peripheral housing (subwoofer enclosure 5) or may be connected to and external of the peripheral housing.

The subwoofer driver 9 is a standard subwoofer driver as is well known to one of ordinary skill in the art. The amplifier circuit 8 is a standard amplifier circuit as is well known to one of ordinary skill in the art. The amplifier circuit 8 controls the sound processing for the subwoofer driver 9 and for the satellite stereo speakers 3 and 4. The amplifier circuit 8 delivers amplified audio signals to the subwoofer driver 9 and satellite stereo speakers 3 and 4, which output the amplified audio signals to the user (not shown). The amplifier circuit 8 receives audio signals for amplification from the broadcast receiver circuit 6 and/or the microcontroller with integrated digital communications interface 7.

The broadcast receiver circuit 6 is connected to the antennae 10 for reception of RF broadcast signals on a selected RF frequency. The broadcast receiver circuit is preferably a FM band broadcast receiver, but may also be a broadcast receiver for another RF frequency band. The broadcast receiver circuit 6, which is connected to the amplifier circuit 8, provides the amplifier circuit 8 with the selected RF frequency broadcast signals for amplification and output to the user (not shown). The broadcast receiver circuit 6 is also connected to the microcontroller with digital communications interface 7. The microcontroller with integrated digital communications interface 7 has two-way communications with the broadcast receiver circuit 6.

The microcontroller with integrated digital communications interface 7 receives control data from the personal computer 11 over the digital communications link 12. The microcontroller with integrated digital communications interface 7 processes the received control data and generates corresponding control signals for the broadcast receiver circuit 6. The microcontroller with integrated digital communications interface 7 then transmits the control signals to the broadcast receiver circuit 6. These control signals might include the user-selected RF tuning frequency, for example. The microcontroller with integrated digital communications interface 7 also receives broadcast signals from the broadcast receiver circuit 6. The broadcast receiver circuit 6 sends status information to the microcontroller with integrated digital communications interface 7. The status information includes, for example, an acknowledgement that the broadcast receiver circuit 6 was able to successfully change the RF tuning frequency to the requested tuning frequency.

The microcontroller with integrated digital communications interface 7 may also receive audio streams from the personal computer 11 over the digital communications link 12 or over an analog link (not shown). In this case, the received audio streams are forwarded to the amplifier circuit 8 for amplification and output to the user (not shown). This allows the multimedia speaker system with broadcast receiver 1 to be used not only for the playback of received broadcast signals, but also for the playback of all audio generated by, received by, or stored by the personal computer 11.

Although the microcontroller with integrated digital communications interface 7 is preferably located within the subwoofer enclosure 5, the microcontroller with integrated digital communications interface 7 may optionally be located outside of the subwoofer enclosure 5. For example, the microcontroller with integrated digital communications interface 7 may instead be located within either satellite stereo speaker 3 or satellite stereo speaker 4. Similarly, the broadcast receiver circuit 6 may also be located within either satellite stereo speaker 3 or 4 rather than within the subwoofer enclosure 5.

The digital communications link 12 connects the microcontroller with integrated digital communications interface 7 to the personal computer 11. The digital communications link 12 is preferably a USB (Universal Serial Bus) link, but may be any digital link such as IEEE-1394 (firewire), or RS-232. The digital communications link 12 may also be a wireless link. The digital communications link 12 transmits control data and in some cases audio streams from the personal computer 11 to the microcontroller with integrated digital communications interface 7. Control data includes, but is not limited to: requested RF tuning frequencies, changes in output volume, commands to turn the broadcast receiver ON or OFF, a requested time to turn the broadcast receiver ON or OFF, etc. Audio streams include PC-generated or stored audio streams, such as wave files.

A personal computer typically includes a display, a microprocessor, memory (e.g. RAM), and a storage media (such as a hard disk drive or HDD). As depicted in FIG. 1, the personal computer 11 includes a digital control interface 13, microprocessor 14, bus 15, and data receiver interface 16. The digital control interface 13 communicates data from the bus 15 to the digital communications link 12. The digital control interface 13 also communicates data from the digital communications link 12 to the bus 15. The digital control interface 13 must support the digital communications link 12. For example, if the digital communications link 12 is a USB link, the digital control interface 13 must support USB communications. The digital control interface 13 is preferably a USB interface. A USB digital control interface for personal computers is well known to those of ordinary skill in the art.

The microprocessor 14 communicates with the digital control interface 13 and/or the data receiver interface 16 via the bus 15. The bus 15 supports two-way communications between the digital control interface 13 and the data receiver interface 16, between the digital control interface 13 and the microprocessor 14, and/or between the data receiver interface 16 and the microprocessor 14. For example, the microprocessor 14 may place data on the bus 15 intended for either the digital control interface 13 or the data receiver interface 16. The microprocessor 14 may also read or receive data placed on the bus 15 by either the digital control interface 13 or the data receiver interface 16.

The microprocessor 14 of the personal computer 11 supports a user interface that provides the user (not shown) with a variety of radio controls. For example, from the user interface the user (not shown) may turn the broadcast receiver circuit 6 ON, change the tuning frequency (either by manually selecting the tuning frequency or by selecting a tuning frequency from a predefined group of presets), change the speaker output volume, set a time for the broadcast receiver circuit 6 to turn ON (set the broadcast alarm clock), set a time for the broadcast receiver circuit 6 to turn off (set the "sleep" function), select a future tuning frequency based on future programming content, set a time and tuning frequency for the recording of a future audio program for later playback (playback in non-real time), and control the reception of other data content for datacasting.

The data receiver interface 16 allows remote programming data to be used to program the broadcast receiver circuit 6. The data receiver interface 16 is preferably a modem for connecting to the internet for gathering remote programming information 17, but may also be a network adapter, a cable connection or any other external data interface that allows access to remote programming information 17. The data receiver interface 16 communicates remote programming information 17 to the microprocessor 14 via the bus 15. The microprocessor 14 may present selected portions or the entirety of the remote programming information 17 to the user (not shown) via the user interface. Alternately, the microprocessor 14 may generate control signals directly, without any user involvement, based upon the remote programming information 17.

By way of example, in operation a user (not shown) may select a tuning frequency from the presets presented to the user (not shown) via the user interface. Based upon the user's selection, the microprocessor 14 generates corresponding control signals. The control signals are sent to the digital control interface 13 via the bus 15. The digital control interface 13 then transmits the control signals to the microcontroller with integrated digital communications interface 7 contained within the subwoofer 2 via the digital communications link 12. The microcontroller with digital communications interface 7 processes the control signals and sends a control signal to the broadcast receiver circuit 6, commanding the broadcast receiver circuit 6 to change to the user's selected RF tuning frequency. The broadcast receiver circuit 6 sends an acknowledgment to the microcontroller with integrated digital communications interface 7, acknowledging the successful change in tuning frequency. The broadcast receiver circuit 6 receives broadcast signals on the selected tuning frequency via the antennae 10. The broadcast signals are sent to the amplifier circuit 8 where they are amplified for playback. The amplified signals are sent to the subwoofer driver 9 and satellite stereo speakers 3 and 4 for output to the user (not shown).

Figure 2:
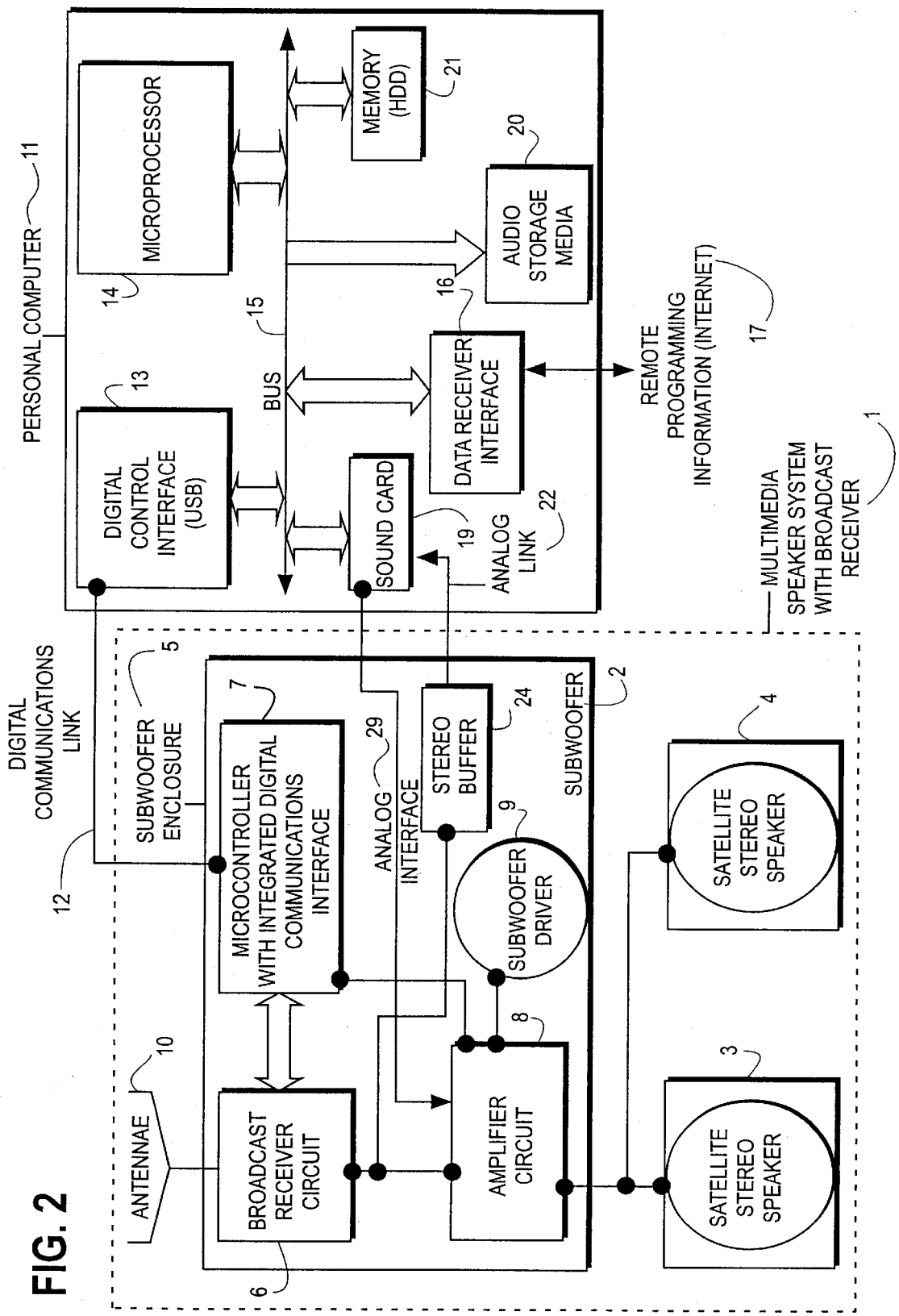
FIG. 2 is a broadcast receiver in a multimedia speaker system with remote digital control and analog upload for storage and transfer.

Referring to FIG. 2, an alternate embodiment of a multimedia speaker system with broadcast receiver 1 is shown. In this embodiment, the further capability of analog upload for storage and transfer is shown. This embodiment also provides the further capability of using the multimedia speaker system with broadcast receiver 1 for output of analog signals received from the sound card 19. In FIG. 2, the subwoofer enclosure 5 further contains a stereo buffer 24. The stereo buffer 24 is an analog buffer for the temporary storage of analog audio signals. The stereo buffer 24 is connected to the broadcast receiver circuit 6. Analog output from the broadcast receiver circuit 6 is stored in the stereo buffer 24.

The personal computer 11 further contains a sound card 19, audio storage media 20, and memory 21. The memory 21 is preferably a hard disk drive (HDD) or other storage media with sufficient size to allow for the storage of large audio signals. The sound card 19 is connected to the stereo buffer 24 by an analog link 22. The analog link 22 transfers analog output from the stereo buffer 24 to the sound card 19. The sound card 19 is connected to the bus 15. The audio storage media 20 and the memory 21 are also connected to the bus 15. The analog signals received by the sound card 19 may be transferred to the audio storage media 20 and/or the memory 21 via the bus 15. The analog signals stored in the audio storage media 20 and/or the memory 21 may be later retrieved and replayed.

The sound card 19 is connected to the amplifier circuit 8 via the analog interface 29. Analog output from the sound card 19 is transmitted to the amplifier circuit 8 via the analog interface 29. The amplifier circuit 8 amplifies the received analog output of the sound card 19 and passes the amplified signal to the subwoofer driver 9 and satellite stereo speakers 3 and 4 for output to the user (not shown). Connecting the sound card 19 to the amplifier circuit 8 not only allows the multimedia speaker system with broadcast receiver 1 to playback received broadcast signals, but also to output sound card audio without requiring a separate set of speakers for the personal computer 11. This additional analog interface between the amplifier circuit 8 and the sound card 19 may be added to any of the embodiments discussed herein if the personal computer 11 is equipped with a sound card 19.

Figure 3:
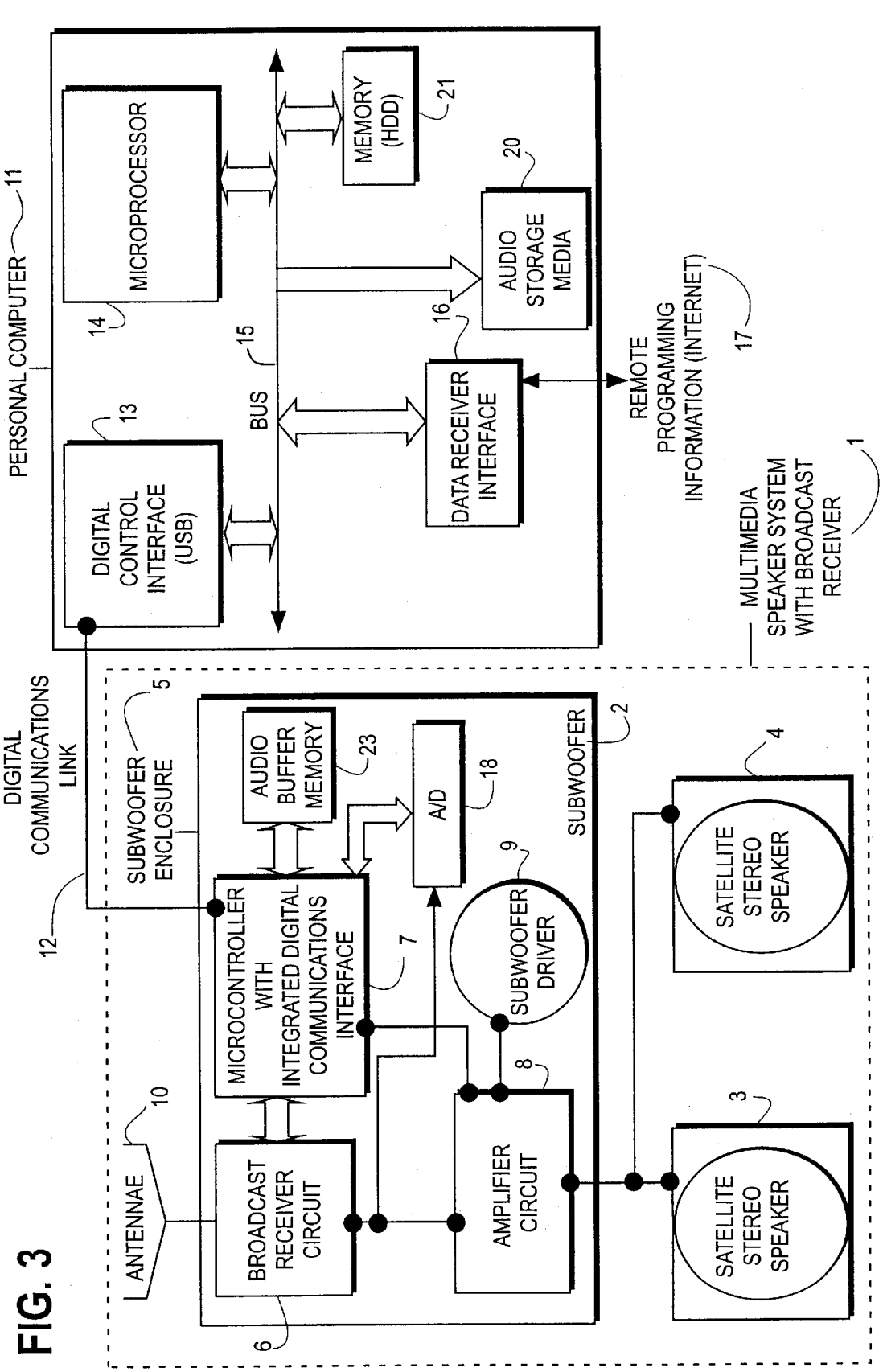
FIG. 3 is a broadcast receiver in a multimedia speaker system with remote digital control and digital audio upload for storage and transfer.

Referring to FIG. 3, an alternate embodiment of a multimedia speaker system with broadcast receiver 1 is shown. In this embodiment, the further capability of digital audio upload for storage and transfer is provided. In FIG. 3, the subwoofer enclosure 5 further contains an analog-to-digital converter 18 (A/D). The analog-to-digital converter 18 is connected to the broadcast receiver circuit 6. The analog-to-digital converter 18 is also connected to the microcontroller with integrated digital communications interface 7. The microcontroller with integrated digital communications interface 7 sends control signals to the analog-to-digital converter 18 to control the conversion performed by the analog-to-digital converter 18. The analog to-digital converter 18 receives analog signals from the broadcast receiver circuit 6. The analog-to-digital converter 18 converts the received analog signals into a digital representation of those signals. The digitized signals that form the output of the analog-to-digital converter 18 are sent to the microcontroller with integrated digital communications interface 7. The microcontroller with digital communications interface 7 may transfer the digitized signals to the personal computer 11 via the digital communications link 12. In this embodiment, firewire 1394 is preferred as it has a sufficiently high bandwidth to allow for the transmission of digitized audio signals to the personal computer 11 while digital control signals are being transmitted to the microcontroller with integrated digital communications interface 7 by the personal computer 11 without a degradation in the quality of the audio transmission. Alternately, a fast USB link, or any digital link with a higher bandwidth, is also acceptable.

The subwoofer enclosure 5 also further contains an audio buffer memory 23. Audio buffer memory 23 may be a separate buffer memory or it may be included within the microcontroller with integrated digital communications interface 7. The microcontroller with integrated digital communications interface 7, the audio buffer memory 23, and the analog-to-digital converter 18 are all preferably connected via the bus of the microcontroller with integrated digital communications interface 7. The audio buffer memory 23 is used to buffer the transfer of data from the microcontroller with integrated digital communications interface 7 across the digital communications link 12. Such buffering permits error detection and correction to be performed without a noticeable interruption in the audio stream that is output to the user (not shown). Data may be transferred from the microcontroller with integrated digital communications interface 7 to the audio buffer memory 23. Correspondingly, data may also be transferred out of the audio buffer 23 and into the microcontroller with integrated digital communications interface 7.

The digitized signals are received in the personal computer 11 by the digital control interface 13. The personal computer 11 further contains audio storage media 20 and memory 21. The memory 21 is preferably a hard disk drive (HDD) or other storage media with sufficient size to allow for the storage of large audio signals. The audio storage media 20 is connected to the bus 15. The memory 21 is also connected to the bus 15. The digitized signals received by the digital control interface 13 may be transferred to the audio storage media 20 and/or the memory 21 via the bus 15. The digitized signals may also be transferred to the microprocessor 14 via the bus 15 for processing before the signals are stored. The digitized signals stored in the audio storage media 20 and/or the memory 21 may also be later retrieved and replayed or transferred to the microprocessor 14 via the bus 15 for processing.

Figure 4:
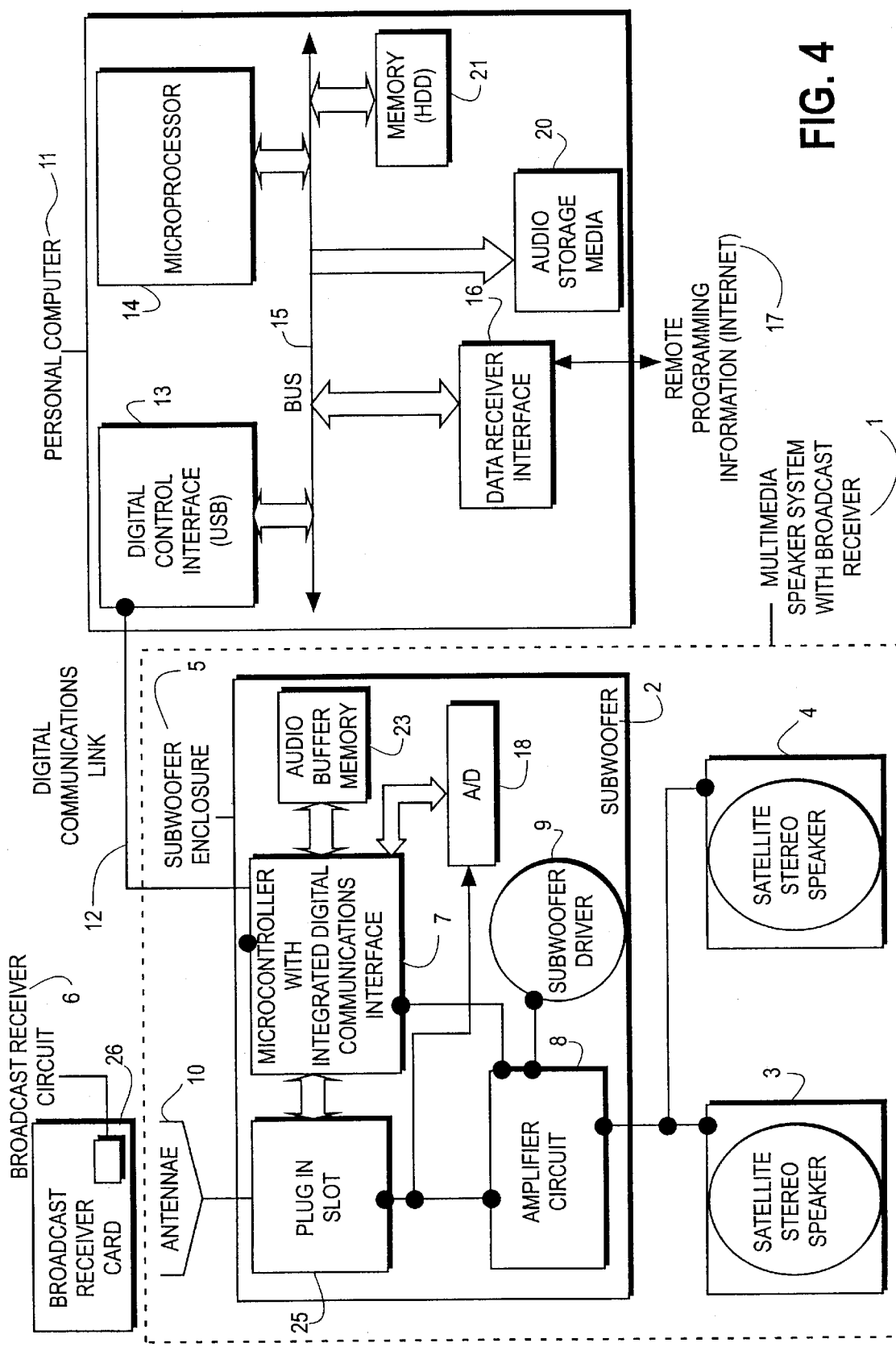
FIG. 4 is a modular broadcast receiver card in a multimedia speaker system.

Referring to FIG. 4, an alternate embodiment of a multimedia speaker system with broadcast receiver 1 is shown. In this embodiment, the broadcast receiver circuit 6 may be configured as a plug-in card to plug into a computer peripheral such as the multimedia speaker system with broadcast receiver 1. In FIG. 4, the subwoofer enclosure 5 further contains a plug-in slot 25. A separate broadcast receiver card 26 may be plugged into the plug-in slot 25. The plug-in slot 25 and broadcast receiver card 26 may feature any type of connector, such as a PCMCIA, a device bay standard connection, or an onboard chip replacement. The broadcast receiver card 26 contains the broadcast receiver circuit 6. The broadcast receiver circuit 6 of the broadcast receiver card 26 interfaces with the microcontroller with integrated digital communications interface 7 and the amplifier circuit 8 via the plug-in slot 25. This embodiment allows for easy upgrade of the broadcast receiver, for example from an analog FM broadcast receiver to a digital FM broadcast receiver. This embodiment also allows the user (not shown) to use the broadcast receiver card 26 in other computer peripherals or other consumer electronics appliances, such as automobile stereos, personal stereos, and/or portable stereos, with a corresponding plug-in slot.

Figure 5:
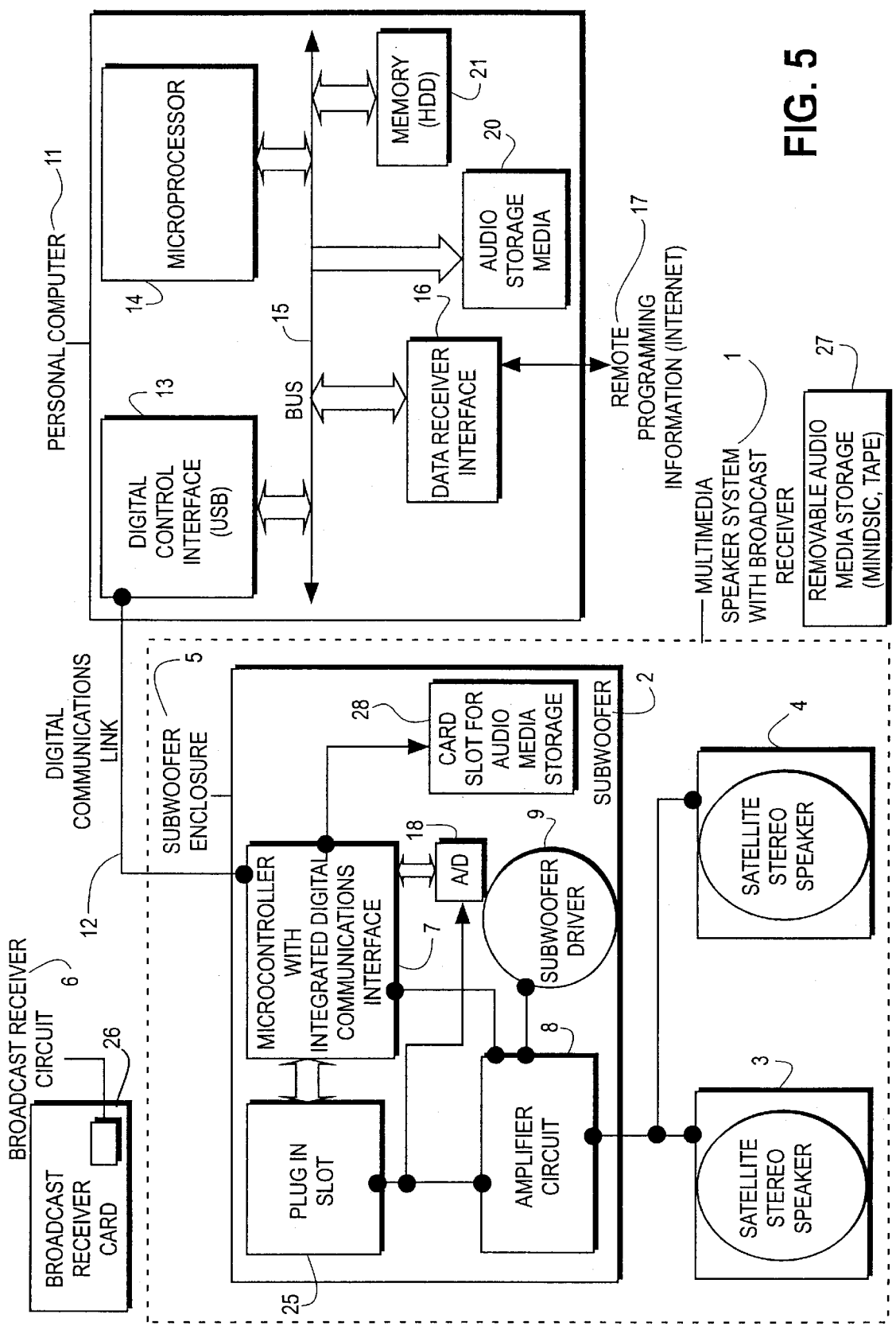
FIG. 5 is a multimedia speaker system with a remote controlled broadcast receiver with audio media storage.

Referring to FIG. 5, an alternate embodiment of a multimedia speaker system with broadcast receiver 1 is shown. In this embodiment, a removable audio storage media for the transfer of audio signals received by the broadcast receiver is shown. In FIG. 5, subwoofer enclosure 5 further includes a card slot for audio media storage 28. The card slot for audio media storage 28 is connected to the microcontroller with integrated digital communications interface 7. Amplified broadcast audio signals from the microcontroller with integrated digital communications interface 7 may be sent to the card slot for audio media storage 28. These amplified broadcast audio signals may be analog or digital depending upon the type of removable audio media storage 27. Removable audio media storage 27, which may be either analog or digital, such as a mini-disc, a circuit or card containing Flash RAM memory, or audio tape, may be inserted into the card slot for audio media storage 28. The amplified broadcast audio signals may then be recorded onto the removable audio media storage 27. The amplified broadcast audio signals on the removable audio media storage 27 may then be played back elsewhere, such as in a car.

Numerous variations on the preferred embodiment and alternate embodiments of the invention are possible. For example, the broadcast receiver circuit 6, microcontroller with integrated digital communications interface 7, and/or amplifier circuit 8 may be located in either satellite stereo speaker 3 or 4 instead of in sub-woofer 2. In another variation, the control signals transmitted from the microprocessor 14 to the microcontroller with integrated digital communications interface 7 may not need further processing and/or formatting by the microcontroller with integrated digital communications interface 7 before being forwarded to the broadcast receiver circuit 6. In another variation, the broadcast receiver circuit 6, microcontroller with integrated digital communications interface 7, and/or amplifier circuit 8 may be located in an alternate external computer peripheral, such as a mouse (or other pointing device), joystick, or keyboard, that is connected to the personal computer 11 via a digital communications link. In another variation, the microcontroller with integrated digital communications interface 7 may be replaced by a separate microcontroller and a separate digital communications interface (as opposed to a single component or circuit with both functions). In another variation, the functionality of the broadcast receiver circuit 6 is provided by a single broadcast receiver chip. In yet another variation, a hybrid chip provides the functionality of the broadcast receiver circuit 6 as well as the functionality of the microcontroller with integrated digital communications interface 7.

Although the preferred embodiment receives FM band broadcast signals, around the 100 MHz range, through the broadcast receiver circuit 6, in alternate embodiments, the broadcast receiver circuit 6 receives broadcast signals on a range of RF frequencies outside of the FM band. An L-band broadcast receiver circuit or chip, which operates around the 1500 MHz range, may be used rather than an FM band broadcast receiver circuit or chip. Similarly, an S-band broadcast receiver, which operates around the 2310–2360 MHz range. An AM band broadcast receiver, or a VHF band broadcast receiver, which operates around the 30–300 MHz range, may be used. Other broadcast receivers operating at different RF ranges may also be used.

Broadcast signals can contain programming signals or information along with the broadcast audio signals. This is commonly referred to as RDS (Radio Data Systems) or RBDS (Radio Broadcasting Data Systems). Examples of broadcast systems which can broadcast programming signals along with broadcast audio include digital FM radio, In-Band On-Channel (IBOC) and Eureka-147.

An In-Band On-Channel (IBOC) broadcast receiver circuit may also be used in place of the broadcast receiver circuit 6. In-Band receivers receive analog and digital programs simultaneously on the same channel on the existing AM and FM bands. The digital program could be used for datacasting. Other types of broadcast receivers can also be used in place of the broadcast receiver circuit 6. Receivers operating a variety of frequency bands are being implemented that provide greater bandwidth than a standard FM receiver. These receivers, generally referred to as Digital Audio Broadcast (DAB) receivers, can receive higher quality audio, programming data, as well as other data transmissions in one broadcast signal. The received broadcast signals contain both audio content and additional transmitted data that may or may not relate to the audio content.

A Eureka-147 broadcast receiver circuit may also be used in place of the broadcast receiver circuit 6. Eureka-147 is a wideband system, interleaved in both frequency and time, for broadcast of Digital Audio Radio (DAR) signals. A prototype Eureka-147 system, using L-band transmission, has been evaluated in Canada. Because of the greater bandwidth available with Eureka-147, it could potentially be used not only for digital radio transmission, but for datacasting as well.

Figure 6:
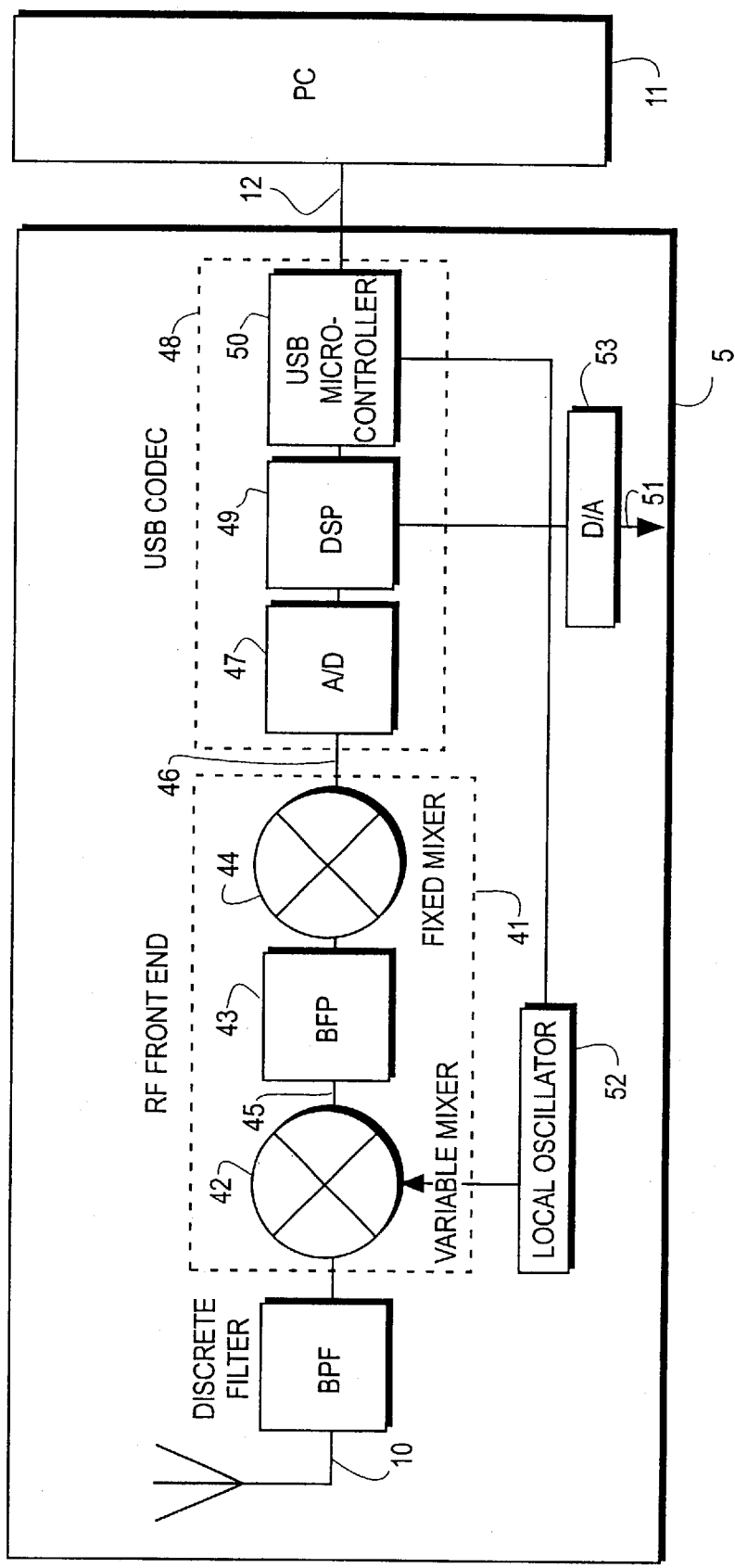
FIG. 6 is a hybrid digital radio receiver for use in a computer peripheral.

When the broadcast receiver is a datacasting receiver, the received broadcast signal must be decoded and the data portion of the signal must be extracted separately from the audio portion of the signal. FIG. 6 shows a hybrid digital broadcast receiver. The hybrid digital broadcast receiver shown in FIG. 6 may be used in place of the broadcast receiver circuit 6 and the microcontroller with digital communications interface 7.

The antennae 10 receive broadcast signals at a designated frequency. The antennae 10 are connected to a discrete filter 40. The discrete filter 40, a bandpass filter, filters out noise from the signal received by the antennae 10. The discrete filter 40 is connected to the RF front end circuitry 41. The RF front end circuitry 41 includes a variable mixer 42, a bandpass filter 43, and a fixed mixer 44. The variable mixer 42 is connected to both the discrete filter 40 and the bandpass filter 43. The bandpass filter 43 is also connected to the fixed mixer 44. Signals received by the RF front end circuitry 41 from the discrete filter 40 are first passed through the variable mixer 42. The output of the variable mixer 42 is at intermediate frequency (IF) 45. If the signals received by the antennae 10 are FM band or IBOC signals, IF 45 will be around 10.7 MHz. If the signals received by the antennae 10 are Eureka-147 signals, IF 45 will be greater than 30 MHz. The output of the variable mixer 42 is passed through the band pass filter 43. The output of the bandpass filter 43 is passed through the fixed mixer 44. The output of fixed mixer 44 is at intermediate frequency (IF) 46. The signals received by the antennae 10 are IBOC or FM band signals (around the 100 MHz range), IF 46 will be around the 455 KHz range. If the signals received by the antennae 10 are Eureka-147, IF 46 will be 5 MHz or greater.

The output of the fixed mixer 44 is the output of the RF front end circuitry 41. The analog signals that are the output of the RF front end circuitry 41 are at IF 46. The RF front end circuitry 41 is connected to the USB codec 48. The USB codec 48 includes an analog-to-digital converter 47 (A/D), a digital signal processor (DSP) 49, and a USB microcontroller 50. The analog-to-digital converter 47 is connected to the fixed mixer 44 and to the DSP 49. The DSP 49 is connected to the USB microcontroller 50. The analog-to-digital converter 47 receives a filtered analog signal from the RF front end 41, and more specifically, from the fixed mixer 44. The analog-to-digital converter 47 converts the filtered analog signal (at intermediate frequency 46) to digital representation of that signal. The digital signal that forms the output of the analog-to-digital converter 47 is passed to the DSP 49. The DSP 49 processes the digital signal. Data extraction is performed by the DSP 49 on the digital signal, extracting the data components (datacasting information) the digital audio components, and/or the analog audio components of the signal received by the antennae 10 and filtered by the RF front end 41. The output of the analog-to-digital converter 47 and the output of the DSP 49 can be 16- or 32-bits wide. The digital components extracted by the DSP 49, or the digital components of the original broadcast signal received by the antennae 10, are passed to the USB microcontroller 50. The USB microcontroller 50 formats the extracted digital component(s) for transmission to the personal computer 11 via the digital communications link 12. Because the digital communications link 12 is preferably a USB link, the USB microcontroller 50 formats the extracted digital component(s) for transmission via a USB link. However, if the digital communications link 12 is an alternate digital link (other than USB) the USB microcontroller 50 formats the extracted digital component(s) for transmission in the specific format of the chosen digital communications link.

The DSP 49 extracts and demodulates the analog component(s) of the original broadcast signal. The analog component(s) extracted and demodulated by the DSP 49, or the filtered and mixed analog component(s) of the original broadcast signal received by the antennae 10, is passed to the digital-to-analog converter 53. The digital-to-analog converter 53 is connected to the DSP 49 and may optionally be included in the USB codec 48 or it may be a separate component. The output 51 of the digital-to-analog converter 53 may be passed to the amplifier circuit 8 (shown in FIGS. 1–5 and 7) for amplification and output to the user. Alternately, the analog output 51 of the digital-to-analog converter 53 may be passed to a sound card, optionally present in the personal computer, via an analog link.

The RF front end 41 may be a circuit comprised of multiple components, or it may be a single chip that provides the above-described functionality. Similarly, the USB codec may be a circuit comprised of multiple components, or it may be a single chip that provides the above-described functionality. Further, in another variant, a single chip may provide the functionality of the RF front end 41 and the USB codec 48.

As shown in FIG. 6, also connected to the USB microcontroller 50 is a local oscillator 52. Control signals, generated by the USB microcontroller 50 in response to control data received over the digital communications link 12, are passed to the local oscillator 52. The local oscillator 52 is connected to the variable mixer 42. Based upon the control signals received, the local oscillator 52 adjusts the variable mixer 42. This allows the USB microcontroller 50 to change the tuning frequency of the broadcast receiver, for example.

In a variation of the embodiment shown in FIG. 6, the USB codec may not have a DSP 49. In this variation, the analog-to-digital converter 47 is connected to the USB microcontroller 50. The USB microcontroller 50 formats the digitized signal that is the output of the analog-to-digital converter 49 and transmits the digitized signal to the personal computer 11 via the digital communications link 12. The microprocessor 5 of the personal computer 11 processes the digitized signal and performs data extraction on the digitized signal, extracting the data components of the signal received by the antennae 10 and filtered by RF front end 41. In this variation, firewire (IEEE-1394) is preferred as the digital communications link 12 because of its increased band width.

Figure 7:
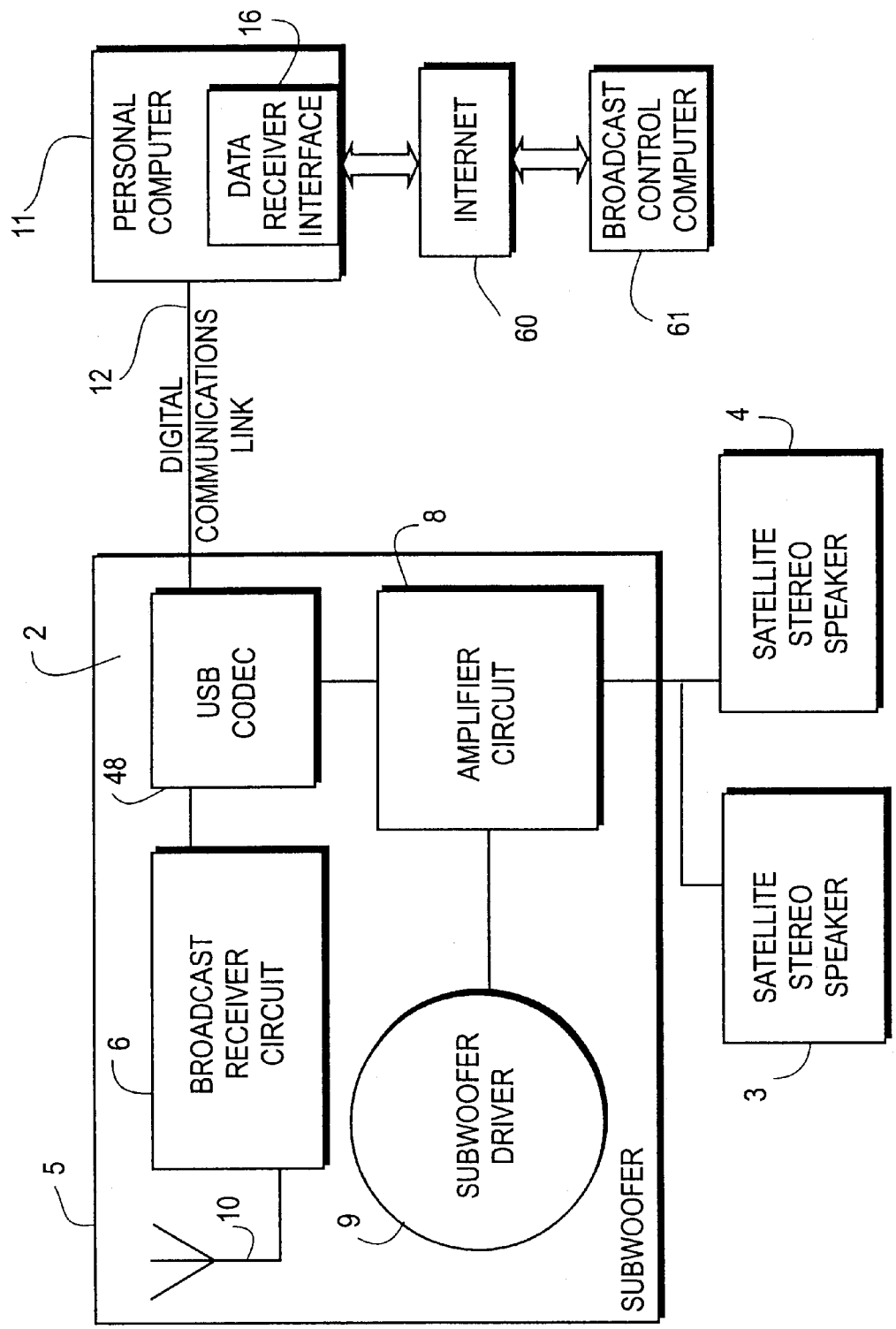
FIG. 7 is a broadcast receiver in a multimedia speaker system with encryption.

Referring to FIG. 7, an alternate embodiment is shown. In this embodiment, the broadcast signals received by the antennae 10 are encrypted. This allows a broadcaster (not shown) to require a user (not shown) to pay for a "key" to be able to receive and play back the encrypted broadcast signals. The antennae 10 are connected to a broadcast receiver circuit 6. In this embodiment, the broadcast receiver circuit 6 is able to receive digital data (datacasting) as well as audio data in a single broadcast signal.

The broadcast receiver circuit 6 is connected to the USB codec 48. The received broadcast signal is passed from the broadcast receiver circuit 6 to the USB codec 48. The USB codec 48 performs data and audio extraction. The USB codec 48 also formats data for transmission over the digital communications link 12 to the personal computer 11. The USB codec 48 data and audio extraction function requires a "key" to be able to extract the data and audio. The extraction algorithm executes on the DSP inside the USB codec 48 and requires at least one constant (or "key") to be able to extract data and audio from the broadcast signal.

The USB codec 48 is connected to the digital communications link 12 and the amplifier circuit 8. The digital communications link 12 connects the USB codec 48 to the personal computer 11. The personal computer 11 contains a data receiver interface 16 that is connected to an external data source such as the internet 60. A broadcaster (not shown) also has a computer, the broadcast control computer 61, connected to the internet. The broadcast control computer 61 contains billing information and key information.

In operation, the user (not shown) interfaces the personal computer 11 to the broadcast control computer 61 via a user interface (not shown) on the personal computer 11 and the internet 60. The user (not shown) enters payment information (such as a credit card number) via the user interface. This information is transferred to the broadcast control computer via the internet 60. Alternately, the user may enter payment information directly into a world-wide web page (not shown) displayed via the user interface.

The broadcast control computer 61 verifies the payment information and sends a key to the personal computer 11 via the internet 60 after the payment information is verified. Alternately, the personal computer 11 and broadcast control computer may communicate directly (without going through the internet) via modem or local area network (LAN), for example.

The personal computer 11 transmits the received key to the USB codec 48 via the digital communications link 12. The DSP inside the USB codec 48 may then use the received key to decode the received broadcast signals. Any encryption algorithm that makes use of a key may be used.

The data portion of the broadcast signal may be encoded, the audio portion may be encoded, or both may be encoded. The encryption algorithm must decode the signal and then the DSP 49 inside the USB codec 48 must extract the audio and data portions of the signal. The DSP 49 must demodulate the analog audio portion and pass the demodulated signal through the digital-to-analog converter 53 before it is passed to the amplifier circuit 8, or alternatively, to a sound card 19 (shown in FIG. 2) within the personal computer 11 via the analog link 22 (shown in FIG. 2). The digital or the data portion of the decoded signal is passed to the personal computer 11 via the digital communications link 12 for processing or storage.

Alternatively, after receiving payment information, the broadcaster (not shown) may send a key to the personal computer via the data portion of a broadcast signal such as IBOC or Eureka-147. If the user (not shown) does not have access to an external data connection (such as the internet), this option allows the user to purchase a key via the telephone or mail and then receive the key via the broadcast signal. In this case, the USB codec 48 extracts the data portion of the received broadcast signal. The key is in the data portion of the broadcast signal. Either the DSP 49 or the USB microcontroller 50 must check the ID accompanying the key (also sent via the data portion of the broadcast signal). If the ID matches the ID of the receiver (stored in a register or memory) associated with the USB codec 48, the USB codec 48 sends a control signal to the personal computer 11 via the digital communications link 12. This control signal activates the user interface (not shown) of the personal computer 11 and allows the user (not shown) to control the broadcast receiver (change the turning frequency, store received data, etc.).

FIG. 2 shows how a standard personal computer sound card 19 can be connected to the amplifier circuit 8 via an analog interface 29 to allow the multimedia speaker system with broadcast receiver 1 to not only output received broadcast signals, but also to output audio signals generated by or stored in the personal computer 11. While FIGS. 1, 3, 4, 5, 6 and 7 do not show a sound card, a personal computer sound card may be used with any of the embodiments and variations described herein by connecting the sound card to the amplifier circuit 8 with an analog interface 29 as shown in FIG. 2.

A preferred embodiment of the present invention is described herein. It is to be understood, of course, that changes and modifications may be made in the above-described embodiments without departing from the true scope and spirit of the present invention as defined by the appended claims.

We claim:

1. A computer peripheral system comprising:
   a personal computer comprising:
      a microprocessor; and
      a personal computer digital control interface connected to said microprocessor; and
   a computer peripheral located remotely from said personal computer, said computer peripheral comprising:
      a housing;
      a peripheral digital communications interface connected to said personal computer digital control interface via a bi-directional digital communications link;
      a broadcast receiver circuit inside said housing;
      an antenna connected to said broadcast receiver circuit; and
      a peripheral microcontroller inside said housing connected to said peripheral digital communications interface, said peripheral microcontroller sending control signals to said broadcast receiver circuit to control said broadcast receiver circuit in response to control data received by said peripheral digital communications interface.

2. The computer peripheral system of claim 1, wherein said peripheral digital communications interface is a wireless communications interface.

3. The computer peripheral system of claim 1, wherein said peripheral digital communications interface is a serial data interface.

4. The computer peripheral system of claim 3, wherein said serial data interface is a Universal Serial Bus interface.

5. The computer peripheral system of claim 3, wherein said serial data interface is an IEEE-1394 compliant interface.

6. The computer peripheral system of claim 1, further comprising at least one speaker connected to said computer peripheral.

7. The computer peripheral system of claim 6, further comprising an audio amplifier circuit located inside said housing and connected to said speaker.

8. The computer peripheral system of claim 1, wherein said personal computer further comprises a data source connected to said microprocessor, said data source comprising broadcast programming information, and wherein said microprocessor communicates at least a portion of said broadcast programming information via said digital communications link to said peripheral microcontroller as said control data.

9. The computer peripheral system of claim 1, wherein said personal computer further comprises a display and a user interface presented on said display, said microprocessor being responsive to data collected via said user interface and generating said control data in response to said data collected via said user interface.

10. The computer peripheral system of claim 1, wherein said computer peripheral further comprises an analog buffer connected to said broadcast receiver.

11. The computer peripheral system of claim 1, wherein said computer peripheral further comprises an analog-to-digital converter connected to a buffer memory, said buffer memory storing audio signal samples.

12. The computer peripheral system of claim 11, wherein said control data comprises an instruction to said peripheral microcontroller to store audio signal samples generated by said analog-to-digital converter in said buffer memory.

13. The computer peripheral system of claim 12, wherein said control data comprises an instruction to the peripheral microcontroller to transfer at least a portion of the audio signal samples stored in said buffer memory through the peripheral digital communications interface.

14. The computer peripheral system of claim 1, wherein said computer peripheral further comprises a plug-in slot.

15. The computer peripheral system of claim 14, wherein said broadcast receiver chip is mounted on a removable broadcast receiver card comprising a connector that mates with the plug-in slot.

16. The computer peripheral system of claim 1, wherein said computer peripheral further comprises a card slot for audio media storage.

17. The computer peripheral system of claim 16, wherein said card slot for audio media storage is an audio cassette unit.

18. The computer peripheral system of claim 16, wherein said card slot for audio media storage is a minidisk unit.

19. The computer peripheral system of claim 16, wherein said card slot for audio media storage is a flash RAM card.

20. The computer peripheral system of claim 1, wherein said housing is the enclosure of a personal computer speaker.

21. The computer peripheral system of claim 20, wherein said antenna is located completely within the enclosure of said personal computer speaker.

22. The computer peripheral system of claim 20, wherein said antenna comprises at least one physical conductor which connects said peripheral digital communications interface to said personal computer digital control interface.

23. The computer peripheral system of claim 1, wherein said housing is the enclosure of a personal computer keyboard.

24. The computer peripheral of claim 1, wherein said housing is the enclosure of a personal computer pointing device.

25. The computer peripheral system of claim 1, wherein said housing is the enclosure of a personal computer monitor.

26. The computer peripheral system of claim 1 wherein said broadcast receiver circuit receives broadcast signals in the VHF band.

27. The computer peripheral system of claim 1 wherein said broadcast receiver circuit receives broadcast signals in the FM band.

28. The computer peripheral system of claim 1 wherein said broadcast receiver circuit receives broadcast signals in the AM band.

29. The computer peripheral system of claim 1 wherein said broadcast receiver circuit receives broadcast signals in the L band.

30. The computer peripheral system of claim 1 wherein said broadcast receiver circuit receives broadcast signals in the S band.

31. The computer peripheral system of claim 1 wherein said broadcast receiver circuit receives IBOC broadcast signals.

32. A multimedia speaker system comprising:

a housing;

a broadcast receiver circuit inside said housing;

an amplifier circuit connected to said broadcast receiver circuit;

a microcontroller connected to said broadcast receiver circuit; and a digital communications interface connected to said microcontroller for two-way communications with a personal computer remote from said multimedia speaker system.

33. The multimedia speaker system of claim 32 wherein said broadcast receiver circuit receives broadcast signals in the VHF band.

34. The multimedia speaker system of claim 32 wherein said broadcast receiver circuit receives broadcast signals in the FM band.

35. The multimedia speaker system of claim 32 wherein said broadcast receiver circuit receives broadcast signals in the AM band.

36. The multimedia speaker system of claim 32 wherein said broadcast receiver circuit receives broadcast signals in the L band.

37. The multimedia speaker system of claim 32 wherein said broadcast receiver circuit receives broadcast signals in the S band.

38. The multimedia speaker system of claim 32 wherein said broadcast receiver circuit receives IBOC broadcast signals.

39. A method of controlling a multimedia speaker system that includes a broadcast receiver within said multimedia speaker system, the method comprising the steps of:

transmitting, from a personal computer, control data over a bi-directional digital communications link;

receiving said control data at said multimedia speaker system, said multimedia speaker system being remote from said personal computer;

interpreting the programming information at said multimedia speaker system and producing broadcast receiver control signals in response;

receiving at said multimedia speaker system, in response to said broadcast receiver control signals, broadcast transmissions on an antenna.

40. The method of claim 39, further comprising the steps of:

transmitting, from the personal computer, control data including an instruction to store audio signal samples in an audio buffer memory samples associated with said broadcast transmissions, and storing said audio signals samples in said audio buffer memory.

41. The method of controlling a multimedia speaker system of claim 39, wherein said broadcast transmissions are in the FM band.

42. The method of controlling a multimedia speaker system of claim 39, wherein said broadcast transmissions are in the AM band.

43. The method of controlling a multimedia speaker system of claim 39, wherein said broadcast transmissions are in the L band.

44. The method of controlling a multimedia speaker system of claim 39, wherein said broadcast transmissions are in the S band.

45. The method of controlling a multimedia speaker system of claim 39, wherein said broadcast transmissions are IBOC transmissions.

46. The method of controlling a multimedia speaker system of claim 39, wherein said broadcast transmissions are in the VHF band.

47. A computer peripheral system comprising:

a personal computer comprising:

a microprocessor; and a personal computer digital control interface connected to said microprocessor; and a computer peripheral located remotely from said personal computer, said computer peripheral comprising:

a housing;

a hybrid chip comprising:

a peripheral digital communications interface connected to said personal computer digital control interface via a bi-directional digital communications link;

a broadcast receiver; and a peripheral microcontroller connected to said peripheral digital communications interface, said peripheral microcontroller sending control signals to said broadcast receiver to control said broadcast receiver in response to control data received by said peripheral digital communications interface; and an antenna connected to said broadcast receiver.

48. The computer peripheral system of claim 47, wherein said broadcast receiver receives broadcast signals in the VHF band.

49. The computer peripheral system of claim 47, wherein said broadcast receiver receives broadcast signals in the FM band.

50. The computer peripheral system of claim 47, wherein said broadcast receiver receives broadcast signals in the AM band.

51. The computer peripheral system of claim 47, wherein said broadcast receiver receives broadcast signals in the L band.

52. The computer peripheral system of claim 47, wherein said broadcast receiver receives broadcast signals in the S band.

53. The computer peripheral system of claim 47, wherein said broadcast receiver circuit receives broadcast signals in the IBOC band.

54. A system for controlling a broadcast receiver circuit in a computer peripheral using a personal computer including:

a computer peripheral including said broadcast receiver circuit; and a personal computer for controlling said broadcast receiver circuit, wherein said computer peripheral is a multimedia speaker.

55. The system of claim 54 wherein said computer peripheral includes an amplifier circuit connected to said broadcast receiver for amplification of audio signals received by said broadcast receiver circuit.

\* \* \* \* \*